Figure 1:
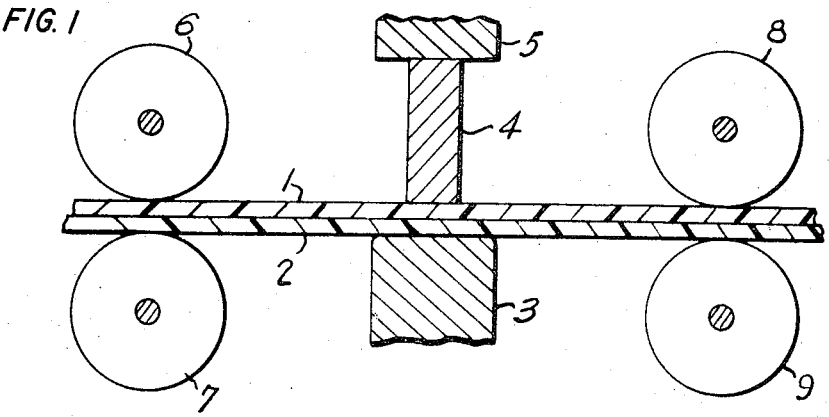

United States Patent

Rowley et al.

[15] 3,640,790
[45] Feb. 8, 1972

[54] SEALING PLASTIC FILM

[72] Inventors: Edward Kenneth Rowley, Beloeil Station, Quebec; Clayton Thomas Waugh, Montreal, Quebec, both of Canada

[73] Assignee: Canadian Industries Limited, Montreal, Quebec, Canada

[22] Filed: Apr. 23, 1970

[21] Appl. No.: 31,229

[30] Foreign Application Priority Data

May 21, 1969 Canada..................................052,161

[52] U.S. Cl.............................................156/251, 156/515
[51] Int. Cl.......................................................B32b 31/18
[58] Field of Search..................................................156/251

[56] References Cited

UNITED STATES PATENTS

| | | | |
|---|---|---|---|
| 3,562,053 | 2/1971 | Lindley | 156/251 |
| 3,115,564 | 12/1963 | Stacyl | 156/251 X |
| 3,441,460 | 4/1969 | Carmichael | 156/251 |
| 3,531,359 | 9/1970 | Jones et al. | 156/515 |

*Primary Examiner*—Reuben Epstein
*Attorney*—Alexander O. McIntosh

[57] ABSTRACT

A method of heat sealing layers of plastic film wherein the film layers are heated in contact until the plastic attains a flowable state, and the area of flowable plastic is then extended until the plastic separates. The molten plastic then retracts towards the unheated flank of the seal area to form matching bead seals. The method is applicable to automatic bagmaking machines.

4 Claims, 3 Drawing Figures

PATENTED FEB 8 1972

3,640,790

INVENTORS
Edward Kenneth ROWLEY
Clayton Thomas WAUGH

*Alexander A. McIntosh*

AGENT

SEALING PLASTIC FILM

This invention relates to a method for heat sealing plastic film.

In the manufacture of containers such as bags from plastic film, it is common practice to form the container joints by welding or heat sealing the plastic film. The strength of the finished container depends to a large extent upon the strength of the seal joining its component parts. A strong seal requires a melting together of the contacting surfaces of the plies of film being sealed without weakening of the adjacent parts of the film. Weakening of the seal border may be avoided by cooling the film adjacent to the seal or by melting together in bead form the adjacent edges of the film. The latter can be carried out by a hot blade or hot wire sealer. However, there are operational advantages to employing sealer bars that during sealing also clamp in place the plies of film being sealed. These, however, give a weaker flange-type seal rather than a bead seal joining the edges of the sealed film.

It has now been found that a bead-type seal can be formed between plies of heat-sealable film employing heated sealer bars if, subsequent to the seal area of the film attaining a state of flow, the heated sealer bar is removed and the seal area while still in a flowable state is extended until the flowable plastic in the seal area separates. The plastic in the area of the seal is found to form a bead along the border of the joined plies of film. This method of forming bead seals can be carried out employing normal sealer bars if the bars are operated at a temperature that gives highly molten plastic and if the sequence of the sealing step is modified to cause extension of the seal area while it is still in a highly flowable state. The novel sealing method provides a strong narrow seal which is particularly applicable to the fabrication of plastic bags.

It is therefore the primary object of this invention to provide a method for forming bead-type seals between plies of heat-sealable film. Additional objects will appear hereinafter.

The sealing method of this invention comprises the steps of 1. heating plies of plastic film in contact at the position of the seal until the plastic attains a molten flowable state, the flanks of the seal position being unheated, 2. extending the hot flowable plastic freely until it separates, and 3. allowing the separated edges of the hot plastic to freely retract towards the unheated flank of the seal area, thus forming the bead seal.

Figure 2:
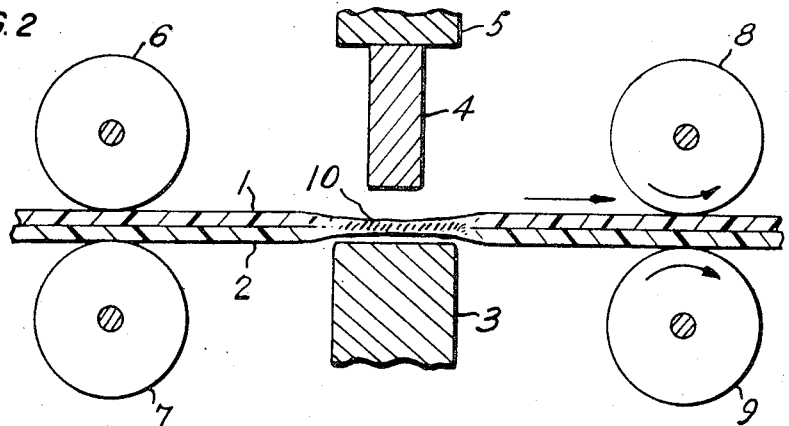
Figure 3:
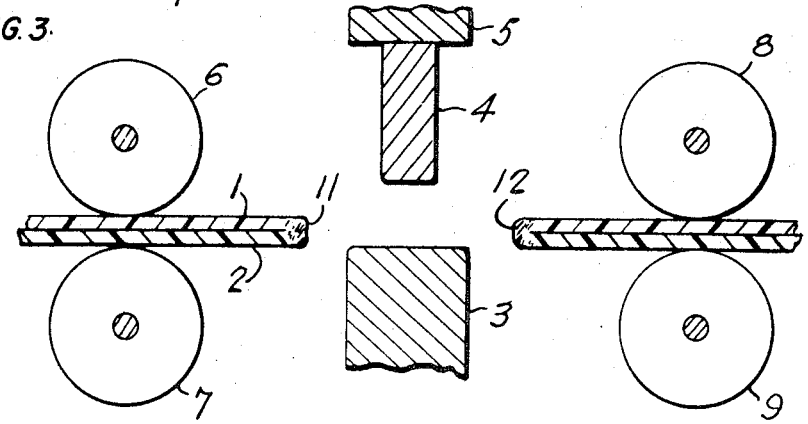

The formation of the bead seal is illustrated in the accompanying drawings wherein FIG. 1 is a diagrammatic vertical section of two plies of film compressed between a sealer bar and anvil;

FIG. 2 is a diagrammatic vertical section showing the extension of the heated seal area of the film of FIG. 1; and FIG. 3 is a diagrammatic vertical section showing the film of FIG. 2 with a completed bead seal.

In FIG. 1 two layers of heat-sealable plastic film 1 and 2 are shown compressed between anvil 3 and heated sealer bar 4. Sealer bar 4 is carried by support 5, of heat insulating material, which is movable in a vertical sense. Nip rolls 6, 7 and 8, 9 control the passage of the film through the sealing apparatus. Sealer bar 4 is kept in contact with the layers of film until the region of film adjacent to the sealer bar face has reached a flowable state. The anvil 3 may also be heated. The faces of the anvil and sealer bar will be provided with a coating that avoids adherence of the hot film.

The heated sealer bar is next raised as shown in FIG. 2 and concurrently the heated region of the film is extended through action of nip rolls 8, 9. This results in drawing down the region 10 of the film which is in a flowable state. This region of course remains heated due to its close proximity to anvil 3 and sealer bar 4.

The extended film finally separates and the separated edges flow back towards the unheated flanks of the seal as shown in FIG. 3. This forms two bead seals 11 and 12.

The making of effective bead seals depends upon correlation between the operation of the sealer bar and the operation of the seal extension means. The film must be drawn out when it reaches a suitable degree of fluidity. A continuous seal of appreciable length can be made in minimum time only if uniform heat transfer conditions exist. It will be understood by one skilled in the art that adjustment of the sealer bar timing and seal extension will vary with thickness and type of film being sealed.

The speed with which the film layers to be sealed are brought to a suitable state of fluidity can be increased if the anvil 3 is replaced by a second sealer bar. This arrangement can also result in the narrowing of the region of film that is melted.

The seal extension means may comprise two sets of nip rolls located on each side of the sealer bar, as shown in the drawings, and driven in cooperation with the operation of said sealer bar. One set of these rolls may be the drive rolls of a conventional heat sealing unit and the other a set of rolls operating on the output side of the sealer unit. Other means of drawing out the seal region are possible, such as plungers that thrust against the film at the flank of the seal or double belt film transports accepting the output from the sealer unit. It is essential that the operation of these seal extension means be coordinated with the operation of the sealer bar unit. The apparatus can form an element of a conventional bagmaking machine serving to concurrently seal and sever plies of plastic film.

The method of this invention can be employed to seal plastic film that melts when heated. It is particularly adapted for use with film formed from a polyolefin such as polyethylene and polypropylene.

The method of this invention provides a means for forming bead seals between layers of heat-sealable film through modification of the operation of conventional machines employed for fabricating plastic bags by heat sealing of films.

What we claim is:

1. A method for heat sealing plies of plastic film comprising
   a. heating the plies of plastic film in contact at the position of the seal by compressing the plies of plastic film between a heated sealer bar and an anvil until the plastic between the sealer bar and the anvil attains a molten flowable state, the flanks of the seal position being unheated,
   b. removing the sealer bar from the position of the seal,
   c. extending the heated flowable plastic freely until it separates, and
   d. allowing the separated edges of the heated plastic to freely retract toward the unheated flank of the seal area, thus forming a bead seal.

2. A method as claimed in claim 1 wherein the film is formed from polyethylene or polypropylene.

3. A method as claimed in claim 1 wherein the heated plastic at the seal position is extended by means engaging the unheated flanks of the seal.

4. A method as claimed in claim 1 which constitutes a step in a process for the manufacture of plastic bags.

* * * * *